United States Patent Office 2,797,234
Patented June 25, 1957

2,797,234

TERTIARY CARBINYL ESTERS AND THEIR PREPARATION

James A. Birbiglia, Nutley, George O. Chase, Hawthorne, and Julius Galender, West Paterson, N. J., assignors to Hoffmann-La Roche Inc., Roche Park, Nutley, N. J., a corporation of New Jersey No Drawing. Application March 2, 1955,
Serial No. 491,782

4 Claims. (Cl. 260—488)

This invention relates to novel chemical compounds and to the preparation of the same. More particularly, it relates to novel tertiary carbinyl esters of a particular constitution hereinafter specified; which esters possess utility as odor-imparting agents in the preparation of perfumes and of scented compositions generally. The invention further relates to novel processes useful in the preparation of said esters.

In order that the field of chemistry with which the instant invention is concerned may be the more readily apparent, and that the system of nomenclature employed in this disclosure may be clearly understood, the novel tertiary carbinyl esters of the invention are herein represented graphically in terms of the following general formula:

(I)
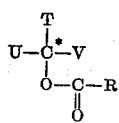

In the above Formula I, the symbols C and O are used in their ordinary connotation to represent carbon and oxygen, respectively. The C* represents the carbinyl carbon atom. The letters R, T, U, and V are arbitrarily chosen to convey the following meanings: R represents hydrogen or an alkyl radical having not more than six carbon atoms, T represents a methyl radical, U represents an unsaturated radical of two carbon atoms (i. e. ethinyl or vinyl), and V represents a (4-methyl-3-hexen-1-yl) radical.

It will be appreciated that the symbol group

in Formula I represents the acyl radical of a lower alkanoic acid, e. g. formic acid, acetic acid, isobutyric acid, n-heptylic acid, and the like. It will be further appreciated that inasmuch as the carbon atom marked with the asterisk is an asymmetric carbon atom, the compounds of the invention are capable of existing in optically active and in optically inactive forms. Similarly, since the (4-methyl-3-hexen-1-yl) radical represented by the symbol V is capable of geometric isomerism, the novel compounds of the invention can exist in cis- and trans-forms. The invention embraces all of the stereoisomeric forms comprehended within the above general Formula I.

In one embodiment, the invention provides a comprehensive process of making the esters of Formula I, which process can be conveniently represented graphically in terms of the following flow sheet:

FLOW SHEET (II)
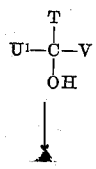

(III)
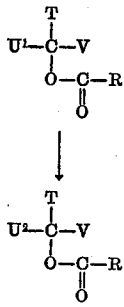

(IV)
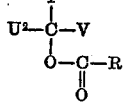

In the above flow sheet, R, T, and V have the arbitrary meanings indicated above, U¹ represents an ethinyl radical and U² represents a vinyl radical.

More explicitly, the comprehensive process referred to above comprises reacting a tertiary carbinol of Formula II with the acid anhydride of a lower alkanoic acid in the presence of an esterification catalyst, thereby producing a methyl-ethinyl-(4-methyl-3-hexen-1-yl)-carbinyl lower alkanoate (Formula III), and catalytically hydrogenating said intermediate of Formula III with one mol of elemental hydrogen.

The first stage of this process may be conveniently effected by reacting a mixture of the carbinol and the acid anhydride (if desired, in solution in an inert solvent for the reactants), in the presence of an esterification catalyst, at about room temperature, i. e. about 25°–30° C. As esterification catalysts, p-toluenesulfonic acid and phosphoric acid have given excellent results; however, other conventional esterification catalysts may be employed within the scope of the invention.

The second stage of the comprehensive process referred to above may be effected by subjecting the intermediate compound of Formula III to reaction with elemental hydrogen in the presence of a catalyst selective to influence the hydrogenation of an acetylenic bond preferentially to an olefinic bond. Catalysts having this specified characteristic are well known to those skilled in the art; for example, see the disclosure by Lindlar, Helvetica Chimica Acta 35, 446 (1952). A preferred catalyst for use in the second stage is that specifically disclosed by Lindlar at page 450 of the cited paper, i. e. a 5% palladium-on-calcium carbonate catalyst whose activity has been reduced by treatment with a lead salt. If desired, quinoline may be used to enhance the selectivity of the catalyst still further, in the manner taught by Lindlar.

As indicated above, the methyl-ethinyl-(4-methyl-3-hexen-1-yl)-carbinyl lower alkanoates and the methyl-vinyl-(4-methyl-3-hexen-1-yl)-carbinyl lower alkanoates of the invention may be used as odoriferous materials in the preparation of perfumes and other scented compositions. These novel esters of the invention all possess pleasant fragrances, generally reminiscent of bergamot.

The starting material, Formula II above, has not been previously described in any printed publication. In order that the instant disclosure may be complete, the preparation of the starting material is described below:

*Preparation of methyl-ethinyl-(4-methyl-3-hexen-1-yl)-carbinol.*—600 g. of the known compound methyl-ethyl-vinyl-carbinol was cooled to +15° C. with an ice bath, then 1800 ml. of concentrated aqueous hydrochloric acid (37% by weight HCl) was poured into the reaction vessel. The mixture was stirred for 30 minutes. The oil, comprising essentially methyl-ethyl-vinyl-carbinyl chloride, was separated, washed three times with 500 ml. of water and dried over calcium chloride.

Four liters of benzene, 1040 g. of ethyl acetoacetate and 378 g. of sodium methylate were stirred into a 12 liter flask. 696 g. of methyl-ethyl-vinyl-carbinyl chloride as produced in the preceding paragraph was added from a separatory funnel in 2 hours at 60° C. The stirring was then continued at 60° C. overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 g. of potassium hydroxide. This was stirred for two hours, then allowed to set overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-5-octen-2-one, distilling at 65° C./10 mm., $n_D^{25} = 1.4412$.

84 g. of metallic sodium was dissolved in 3 liters of liquid ammonia. Acetylene was bubbled into the stirred solution until its color changed from blue to a white. 420 g. of 6-methyl-5-octen-2-one was dissolved in 500 ml. of diethyl ether and dropped into the stirred reaction mixture in one hour. Stirring was then continued for 3 hours while a slow stream of acetylene was bubbled in. The acetylene was then stopped, but the stirring was continued for about 15 hours. The ammonia was then distilled off and the residue in the reaction vessel was washed with 2 liters of 5% aqueous sulfuric acid. The product was then water washed, dried over anhydrous calcium sulfate and fractionated to yield methyl-ethinyl-(4-methyl-3-hexen-1-yl)-carbinol, distilling at 89° C./10 mm., $n_D^{25} = 1.4612$.

The invention is further disclosed in the following examples which are illustrative but not limitative thereof.

*Example 1*

In a 1-liter, 3-neck flask equipped with a thermometer, stirrer, dropping funnel, and a calcium chloride tube were placed 300 ml. of acetic anhydride. To this was added slowly, with stirring, 150 ml. of 98–99% formic acid through the dropping funnel. Considerable energy was evolved and the mixture darkened in color. With an ice and water bath, the addition required about 10 minutes at a maximum temperature of 30° C.

When no further energy was evolved, 2.67 g. of syrupy aqueous phosphoric acid (85% by weight $H_3PO_4$) was added along with 249 g. of methyl-ethinyl-(4-methyl-3-hexen-1-yl)-carbinol. The reaction mixture was permitted to stand for four days at room temperature. The mixture was stirred with 200 ml. of cold water, diluted with 200 ml. of petroleum naphtha and transferred to a separatory funnel. The aqueous phase was drawn off and the organic phase was washed again with 200 ml. of cold water. The excess acidity was destroyed by washing with 10% aqueous sodium carbonate solution to a pH of 11 and then with sufficient water until neutral to litmus. The product was dried, the solvent removed, and the residue distilled under high-vacuum. The fraction distilling at 69–70° C./0.6 mm., $n_D^{25} = 1.4553$–1.4558, was methyl-ethinyl-(4-methyl-3-hexen-1-yl)-carbinyl formate. This material has a pleasant, slightly sharp fragrance reminiscent of orange blossoms and bergamot, and is useful as an odoriferant.

*Example 2*

In a 5-liter, 3-neck flask equipped with a sealed stirrer, hydrogen addition tube and thermometer were placed 194 g. of methyl-ethinyl-(4-methyl-3-hexen-1-yl)-carbinyl formate, 194 ml. of petroleum naphtha and 1.94 g. of Pd-$CaCO_3$-Pb catalyst (Lindlar, page 450 above cited). The hydrogenator was flushed with nitrogen and then with hydrogen. The stirrer was started and the hydrogenation was carried out at 8 to 10 inches of water pressure at a temperature of $+15°$ C. until the hydrogen uptake ceased. At that time a test of the reaction mixture for acetylenic bodies was ammoniacal silver nitrate was negative. The catalyst was removed by filtration, and the solvent was removed under reduced pressure. The residue was distilled in vacuo thereby yielding as the main fraction methyl-vinyl-(4-methyl-3-hexen-1-yl)-carbinyl formate, B. P. 50–53° C./0.2–0.3 mm., $n_D^{25} = 1.4525$–1.4535. This substance is an odoriferant, possessing a bergamot-like fragrance.

*Example 3*

In a 1-liter, 3-neck flask equipped with a thermometer, stirrer, dropping funnel and calcium chloride tube were placed 166 g. of methyl-ethinyl-(4-methyl-3-hexen-1-yl)-carbinol and 1.78 g. of aqueous phosphoric acid (85% by weight $H_3PO_4$). To this reaction mixture was added slowly a total of 123.5 g. of acetic anhydride. The reaction temperature was controlled by means of a bath of cooling water, and was held between 25° and 30° C. The reaction was quite energetic and the mixture darkened in color. The time of addition of acetic anhydride was about thirty minutes. When no further energy was evolved the reaction mixture was permitted to stand overnight at room temperature. The reaction mixture was diluted with 200 ml. of petroleum naphtha and washed by the addition, with stirring, of 200 ml. of cold (15° C.) water. The mixture was transferred to a separatory funnel, the aqueous phase drawn off and the excess acidity in the organic phase was destroyed by washing with 400 ml. of 10% aqueous sodium carbonate solution in two equal portions (to pH 11). Washing was continued with sufficient aliquots of water until the water wash was neutral to litmus. The product was dried by distilling solvent and water, and the residue was fractionated in high-vacuum. The main fraction was methyl-ethinyl-(4-methyl-3-hexen-1-yl)-carbinyl acetate, B. P. 59°–61° C./0.2 mm., $n_D^{25} = 1.4535$–1.4545. This substance is useful as an odoriferant, and possesses a spicy odor reminiscent of bergamot.

*Example 4*

In a 5-liter, 3-neck flask equipped with a sealed stirrer, hydrogen addition tube and thermometer were placed 210 g. of methyl-ethinyl-(4-methyl-3-hexen-1-yl)-carbinyl acetate, 210 ml. of petroleum naphtha and 2.1 g. of Pd-$CaCO_3$-Pb catalyst (same catalyst as used in Example 2 above). The hydrogenator was flushed with nitrogen and then with hydrogen. The stirrer was started and the hydrogenation carried out at 8 to 10 inches of water pressure at a temperature of 15° C. The absorption of hydrogen was theoretical, and a test made for acetylenic bodies with ammoniacal silver nitrate was negative. The catalyst was removed by filtration and the solvent removed under reduced pressure. The residue was distilled under reduced pressure. The main fraction, methyl-vinyl-(4-methyl-3-hexen-1-yl)-carbinyl acetate, B. P. 53°–56° C./0.1 mm., $$n_D^{25} = 1.4505\text{--}1.4515$$

has a fine fragrance reminiscent of bergamot, but with an animal character, and is useful in perfumery as an odor-imparting agent.

*Example 5*

In the same manner described in Example 3, 249 g. of methyl-ethinyl-(4-methyl-3-hexen-1-yl)-carbinol was reacted with 234 g. of n-propionic anhydride in the presence of 2.67 g. of aqueous phosphoric acid (85% $H_3PO_4$ by weight). The ester product was isolated in the manner described in Example 3. The so obtained methyl-ethinyl-(4-methyl-3-hexen-1-yl)-carbinyl n-propionate, B. P. 65°–69° C./0.2 mm., $n_D^{25} = 1.4525$–1.4535, possesses a pleasant fragrance reminiscent of lily of the valley and bergamot, and is useful as an odoriferant.

*Example 6*

Methyl - vinyl - (4 - methyl - 3 - hexen - 1 - yl) - carbinyl n-propionate was prepared by the selective hydrogenation of methylethinyl-(4-methyl-3-hexen-1-yl)-carbinyl n-propionate in the manner described in Example 4. The quantities of materials employed were as follows:

222 g. of methyl-ethinyl-(4-methyl-3-hexen-1-yl)-carbinyl n-propionate
222 ml. of petroleum naphtha and
2.3 g. of Pd-CaCO₃-Pb catalyst (same catalyst used in Example 2)

The ester product, obtained upon fractionation under reduced pressure, methyl-vinyl-(4-methyl-3-hexen-1-yl)-carbinyl n-propionate, had B. P. 60°–62° C./0.1 mm., $n_D^{25}$=1.4505–1.4515. It is an odor-imparting agent possessing a bergamot-like fragrance.

*Example 7*

Methyl - ethinyl - (4 - methyl - 3 - hexen - 1 - yl)-carbinyl isobutyrate was prepared from methyl-ethinyl-(4-methyl-3-hexen-1-yl)-carbinol and isobutyric anhydride in the manner described in Example 3. The quantities of materials employed were as follows:

249 g. of methyl-ethinyl-(4-methyl-3-hexen-1-yl)-carbinol
285 g. of isobutyric anhydride
500 ml. of petroleum naphtha
2.67 g. aqueous phosphoric acid (85% H₃PO₄ by weight)

The ester product obtained, methyl-ethinyl-(4-methyl-3-hexen-1-yl)-carbinyl isobutyrate, had the following characteristics:

B. P.=69°–71° C./0.1–0.2 mm.
$n_D^{25}$=1.4495–1.4505

This material has a bergamot-like odor, but with a fruity note, and is useful as an odoriferant.

*Example 8*

Methyl - vinyl - (4 - methyl - 3 - hexen - 1 - yl) - carbinyl isobutyrate was prepared by the selective hydrogenation of methyl-ethinyl-(4-methyl-3-hexen-1-yl)-carbinyl isobutyrate, in the manner described in Example 4. The quantities of materials employed were as follows:

200 g. of methyl-ethinyl-(4-methyl-3-hexen-1-yl)-carbinyl isobutyrate
200 ml. of petroleum naphtha and
2.4 g. of Pd-CaCO₃-Pb catalyst (same catalyst used in Example 2)

The ester obtained on distillation, methyl-vinyl-(4-methyl-3-hexen-1-yl)-carbinyl isobutyrate, had the following properties:

B. P.=61°–63° C./0.1–0.15 mm.
$n_D^{25}$=1.4475–1.4485

This material has an odor reminiscent of bergamot and is useful in perfumery as an odor-imparting agent.

We claim:

1. A process of making a tertiary carbinyl ester having the formula

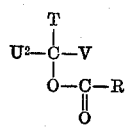

wherein

represents the acyl radical of a lower alkanoic acid, T represents a methyl radical, U² represents a vinyl radical, and V represents a (4-methyl-3-hexen-1-yl) radical which comprises reacting a carbinol of the formula

wherein T and V have the same meanings as above, and U¹ represents an ethinyl radical with a lower alkanoic acid anhydride in the presence of an esterification catalyst, and catalytically hydrogenating the resulting ester with one mol of elemental hydrogen.

2. A process of making methyl-vinyl-(4-methyl-3-hexen-1-yl)-carbinyl lower alkanoate which comprises catalytically hydrogenating methyl-ethinyl-(4-methyl-3-hexene-1-yl)-carbinyl lower alkanoate with one mol of elemental hydrogen.

3. Methyl-ethinyl-(4-methyl-3-hexen-1 - yl) - carbinyl lower alkanoate.

4. A process of making a compound according to claim 3 which comprises reacting methyl-ethinyl-(4-methyl-3-hexen-1-yl)-carbinol with a lower alkanoic acid anhydride in the presence of an esterification catalyst.

References Cited in the file of this patent

UNITED STATES PATENTS 2,423,545     Aeschbach _____ July 8, 1947

FOREIGN PATENTS 601,070     Germany _____ Aug. 16, 1934

OTHER REFERENCES

Takai et al.: Chem. Abstracts 33 (1939), 2558 (3).
Zalimanovich: Chem. Abstracts 43 (1949), 3778.
Lindlar: Helv. Chim. Acta 35 (1952) 450.
Simonsen et al.: "The Terpenes" (Cambridge Univ. Press, Cambridge, England, 1952), v. 1, pages 57–68.